(12) United States Patent
Munson, Jr. et al.

(10) Patent No.: US 12,187,404 B2
(45) Date of Patent: Jan. 7, 2025

(54) VARIABLE DENSITY AIRSHIP LIFT CHAMBER SYSTEM

(71) Applicant: FOI GROUP, LLC, Dallas, TX (US)

(72) Inventors: David Munson, Jr., Dallas, TX (US); David Shawn Flatt, Forney, TX (US)

(73) Assignee: FOI Group, LLC, Dallas, TX (US)

( * ) Notice: Subject to any disclaimer, the term of this patent is extended or adjusted under 35 U.S.C. 154(b) by 50 days.

(21) Appl. No.: 18/111,232

(22) Filed: Feb. 17, 2023

(65) Prior Publication Data

US 2023/0264800 A1 Aug. 24, 2023

Related U.S. Application Data

(60) Provisional application No. 63/312,479, filed on Feb. 22, 2022.

(51) Int. Cl.
*B64B 1/62* (2006.01)
*B64B 1/22* (2006.01)

(52) U.S. Cl.
CPC . *B64B 1/62* (2013.01); *B64B 1/22* (2013.01)

(58) Field of Classification Search
CPC .................................. B64B 1/62; B64B 1/22
See application file for complete search history.

(56) References Cited

U.S. PATENT DOCUMENTS

| 4,012,016 | A  | * | 3/1977  | Davenport  | B64B 1/62 244/128 |
| 6,182,924 | B1 | * | 2/2001  | Nott       | B64B 1/62 244/96  |
| 7,568,656 | B2 |   | 8/2009  | Handley    |                   |
| 2005/0236519 | A1 | * | 10/2005 | Handley | B64B 1/62 244/128 |
| 2006/0000945 | A1 | * | 1/2006  | Voss    | B64B 1/60 244/97  |
| 2007/0057116 | A1 | * | 3/2007  | Sinsabaugh | B64B 1/62 244/96 |
| 2022/0219800 | A1 | * | 7/2022  | Neff    | B64B 1/60         |

FOREIGN PATENT DOCUMENTS

EP 1591356 B1 12/2008

* cited by examiner

*Primary Examiner* — Tye William Abell

(57) ABSTRACT

A variable density airship lift chamber system for airships provides more efficient lift control. The airship lift chamber system includes at least one lift chamber filled with lift gas and configured to provide lifting force, a heat exchanger configured to heat the lift gas in the at least one lift chamber, a compressor unit configured to withdraw the lift gas from the lift chamber and to compress the withdrawn lift gas, a pressure tank configured to store the withdrawn compressed lift gas from the compressor unit, a refrigeration orifice formed in the lift chamber, and a valve that connects the pressure tank to lift chamber through the refrigeration orifice. The airship lift chamber system controls density of the lift gas in the lift chamber by heating the gas while removing the gas from the lift chamber and by supplying gas into the lift chamber.

18 Claims, 4 Drawing Sheets

VARIABLE DENSITY AIRSHIP LIFT CHAMBER SYSTEM

CROSS REFERENCE TO RELATED APPLICATIONS

This application claims priority to U.S. Provisional Patent Application No. 63/312,479, filed Feb. 22, 2022, the entire contents of which are incorporated herein by reference.

BACKGROUND

Airship is lighter-than-air aircraft that can navigate through air with propulsion and steering systems. The lift force of the airship is provided by lifting gas contained in gasbags. The lifting gas in the gasbags is less dense than the surrounding air. The lifting force is produced by a difference in density between the lifting gas and the surrounding air. The airship may have an envelope that may include one or more gasbags to provide the lifting force, and may have a gondola suspended below the envelope. The gondola may include cabins for passengers and freight and may include control systems to control the navigation of the airship system. The gondola may be fitted with engines to provide propulsion of the airship system. As atmospheric pressure and air density change based on altitude, there is a need to efficiently manage the pressure and density of the lifting gas for smooth navigation of the airship through altitudes.

SUMMARY

The disclosed invention is directed to a variable density airship lift chamber system that can more efficiently manage the lifting force of the airship system, while controlling pressure inside the lift chamber to minimize stresses on the lift chamber caused by pressure difference.

These advantages and others are achieved, for example, by an airship lift chamber system for an airship. The airship lift chamber system includes at least one lift chamber filled with lift gas and configured to provide lifting force, a heat exchanger configured to heat the lift gas in the at least one lift chamber, a compressor unit configured to withdraw the lift gas from the lift chamber and to compress the withdrawn lift gas, a pressure tank configured to store the compressed withdrawn lift gas from the compressor unit, a refrigeration orifice formed in the lift chamber, and a valve that connects the pressure tank to lift chamber through the refrigeration orifice.

The compressor unit may include at least one compressor connected to the at least one lift chamber to withdraw the lift gas from the lift chamber and configured to compress the withdrawn lift gas. Alternatively, the compressor unit may include at least one compressor connected to the at least one lift chamber to withdraw the lift gas from the lift chamber and configured to compress the withdrawn lift gas, and at least one intercooler connected to the at least one compressor and configured to cool the compressed withdrawn lift gas from the compressor. The airship lift chamber system may further include a waste heat flow valve configured to transfer heat from the at least one intercooler to the lift chamber or atmosphere. The waste heat flow valve may be configured to transfer heat from the at least one intercooler to the atmosphere while the at least one compressor operates to provide more lift gas to the lift chamber from the pressure tank. The waste heat flow valve may be configured to transfer heat from the at least one intercooler to the lift chamber while the at least one compressor operates to store the lift gas in the pressure tank. The valve may be configured to be closed while the heat exchanger heats the lift gas. The lift gas may be lighter-than-air gas. The lift chamber may be a variable volume chamber that is configured to be expandable and shrinkable.

These advantages and others are also achieved, for example, by an airship system that includes at least one lift chamber filled with lift gas and configured to provide lifting force, a gondola connected to the at least one lift chamber and comprising at least one lift chamber control unit, a refrigeration orifice formed in the lift chamber, and a valve that connects the pressure tank to lift chamber through the refrigeration orifice. The at least one lift chamber control unit includes a heat exchanger configured to heat the lift gas in the at least one lift chamber, a compressor unit configured to withdraw the lift gas from the lift chamber and to compress the withdrawn lift gas, and a pressure tank configured to store the compressed withdrawn lift gas from the compressor unit.

BRIEF DESCRIPTION OF THE DRAWINGS

The preferred embodiments described herein and illustrated by the drawings hereinafter be to illustrate and not to limit the invention, where like designations denote like elements.

DETAILED DESCRIPTION

Figure 1:
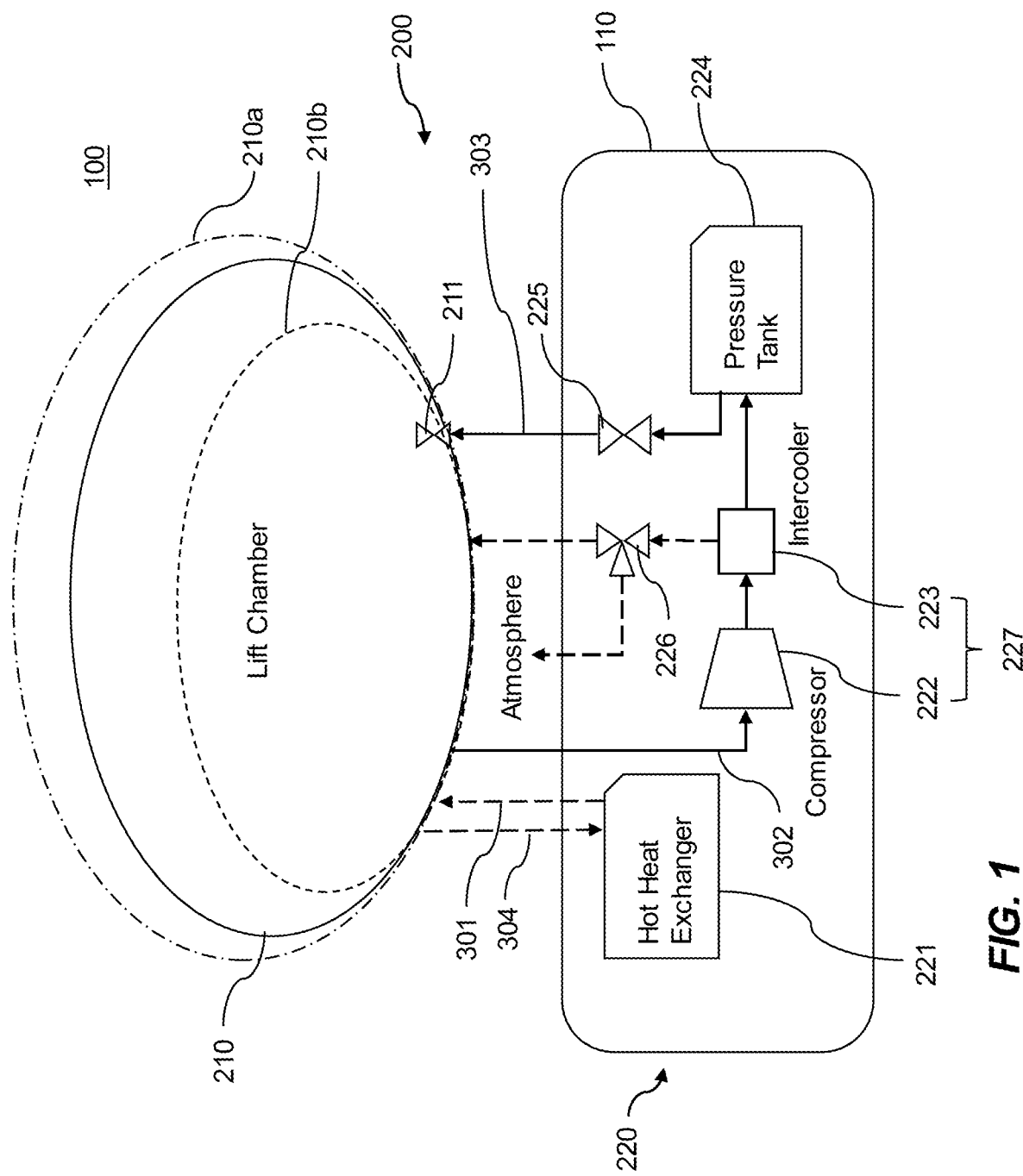
FIG. 1 is a diagram schematically illustrating an embodiment of the variable density airship lift chamber system of the disclosed invention.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims. It is also to be understood that the drawings included herewith only provide diagrammatic representations of the presently preferred structures of the present invention and that structures falling within the scope of the present invention may include structures different than those shown in the drawings.

The variable density airship lift chamber system of the disclosed invention includes one or more devices to heat and cool lift gas in the lift chamber, and one or more devices to add lift gas to the lift chamber and to subtract lift gas from the lift chamber. The lift chamber is a variable volume chamber that can expand and shrink based on pressure, temperature and amount (number of particles) of lift gas in the chamber. It may be ideal to control the amount of lift gas to maintain a substantially constant or optimum pressure within the lift chamber that may be approximately equal to or slightly higher than atmospheric pressure acting on the exterior of the lift chamber for minimum stresses on the lift chamber.

With reference to FIG. 1, shown is a diagram of an airship system 100 that includes an embodiment of the variable density airship lift chamber system 200 of the disclosed invention. The airship system 100 includes at least one lift chamber 210 that is filled with lift gas to provide lifting force and gondola 110 coupled to the lift chamber 210. The airship system 100 may further include one or more engines 111 (see FIG. 4) that are coupled to the gondola 110 and are configured to provide propulsion to the gondola 110 and lift chamber 210 to move the airship system 100 in a desired direction. The engines 111 may include typical engines that can be used for airships. The lift gas may be lighter-than-air gas such as helium. The lift chamber 210 is a variable volume chamber that is configured to be expandable and shrinkable so that the volume of the lift chamber 210 changes based on pressure, temperature and amount of lift gas in the lift chamber 210. FIG. 1 exemplarily shows variable volumes 210a, 210b of the lift chamber 210. For example, when the lift gas in the lift chamber 210 is heated, the lift chamber 210 may expand to the larger volume 210a, and when the lift gas in the lift chamber 210 is cooled, the lift chamber 210 may shrink to the smaller volume 210b.

The airship lift chamber system 200 of the disclosed invention includes lift chamber 210, refrigeration orifice 211 located inside or on a surface of the lift chamber 210, and lift chamber control unit or system 220 that is configured to control density and pressure of the lift gas in the lift chamber 210. The lift chamber control unit 220 may be placed in the gondola 110. The lift chamber control unit 220 includes heat exchanger 221, compressor unit 227, pressure tank 224, and valve 225. The refrigeration orifice 211 is connected to the pressure tank 224 through line 303 and the valve 225. In an embodiment, the compressor unit 227 includes at least one compressor 222. In another embodiment, the compressor unit 227 includes at least one compressor 222 and at least one intercooler 223 connected to the compressor 222. When the compressor unit 227 includes at least one intercooler 223, the lift chamber control unit 220 further includes waste heat flow valve 226 connected to the intercooler 223 to transfer heat from the intercooler 223 to atmosphere or the lift chamber 210, as shown in FIG. 1. The functionalities of these components are described below.

When more lifting force is needed, the lift gas in the lift chamber 210 flows through line 304 to heat exchanger 221 that adds heat and increases the lift gas temperature before returning to the lift chamber 210 through line 301. While the lift gas is heated, the lift chamber 210 may expand, increasing its volume, ideally to the point that equilibrium is reached between atmospheric pressure and pressure of the lift gas inside the lift chamber 210. The increased volume of the lift chamber 210 increases lifting force of the lift chamber 210. However, in order to control expansion of the volume of the lift chamber 210 and/or to prevent over-expansion of the lift chamber 210, the lift gas may be also removed from the lift chamber 210 by operating compressor 222 connected to the lift chamber 210 through line 302. Removing lift gas from the lift chamber 210 effectively reduces the pressure inside the lift chamber 210. For example, as long as the pressure in the lift chamber 210 is higher than or equal to ambient air pressure, the volume may not be reduced even though gas is removed from the lift chamber 210. At this condition, lifting force generated by the volume is maintained while pressure in the chamber may be reduced or controlled to prevent over-expansion of the lift chamber 210. In this way, the pressure in the lift chamber 210 can be controlled, while increasing or decreasing lifting force of the lift chamber 210 by the volume of the lift chamber 210. The lift gas removed from the lift chamber 210 is compressed by the compressor 222 and is supplied to the pressure tank 224 that stores the compressed lift gas until the lift gas is needed to increase density and lower temperature. At this stage, the valve 225 is closed. The heat exchanger 221 can be heated by waste heat from a power plant or heat from a biochar making system or both.

When the lifting force needs to be reduced, the heat exchanger 221 may stop heating the lift gas in the lift chamber 210. Consequently, the volume of the lift chamber 210 decreases as the lift chamber 210 cools down, lowering lifting force. At this stage, the valve 225, which connects the pressure tank 224 to the lift chamber 210 through line 303, is opened and the compressed lift gas stored in the pressure tank 224 flows into the lift chamber 210 through the valve 225 and the refrigeration orifice 211. The compressed lift gas flowing into the lift chamber 210 may provide refrigerating effect in the lift chamber 210, accelerating the cooling of the lift chamber 210. Furthermore, it is possible to create more cooling by running compressor 222 and returning the compressed lift gas through the refrigeration orifice 211 to cool the lift gas in the lift chamber 210 more.

As shown in FIG. 1, the compressed lift gas is supplied to the pressure tank 224 through intercooler 223. Compressing lift gas to remove it from the lift chamber 210 will heat the gas, and it is desirable to cool the gas after compression to store more gas in the pressure tank 224. The use of intercooler 223 between compression stage and after compression cuts compressor work, increases storage of the pressure tank 224, and provides more heat when needed to heat lift gas in lift chamber 210. For example, if the compressor 222 is being run to provide more gas for the refrigeration orifice 211 to increase the density of the lift gas in the lift chamber 210, then it is desirable to dissipate heat from the intercooler 223 into the atmosphere. However, if the compressor 222 is run to lower the density of lift gas in the lift chamber 210 while the lift gas is heated, then it is desirable that the waste heat be supplied to the lift gas inside the lift chamber 210. The waste heat flow valve 226 connected between the intercooler 223 and the lift chamber 210 works as a switch to direct the heat from the intercooler 223 into atmosphere or into the lift chamber 210.

Figure 2:
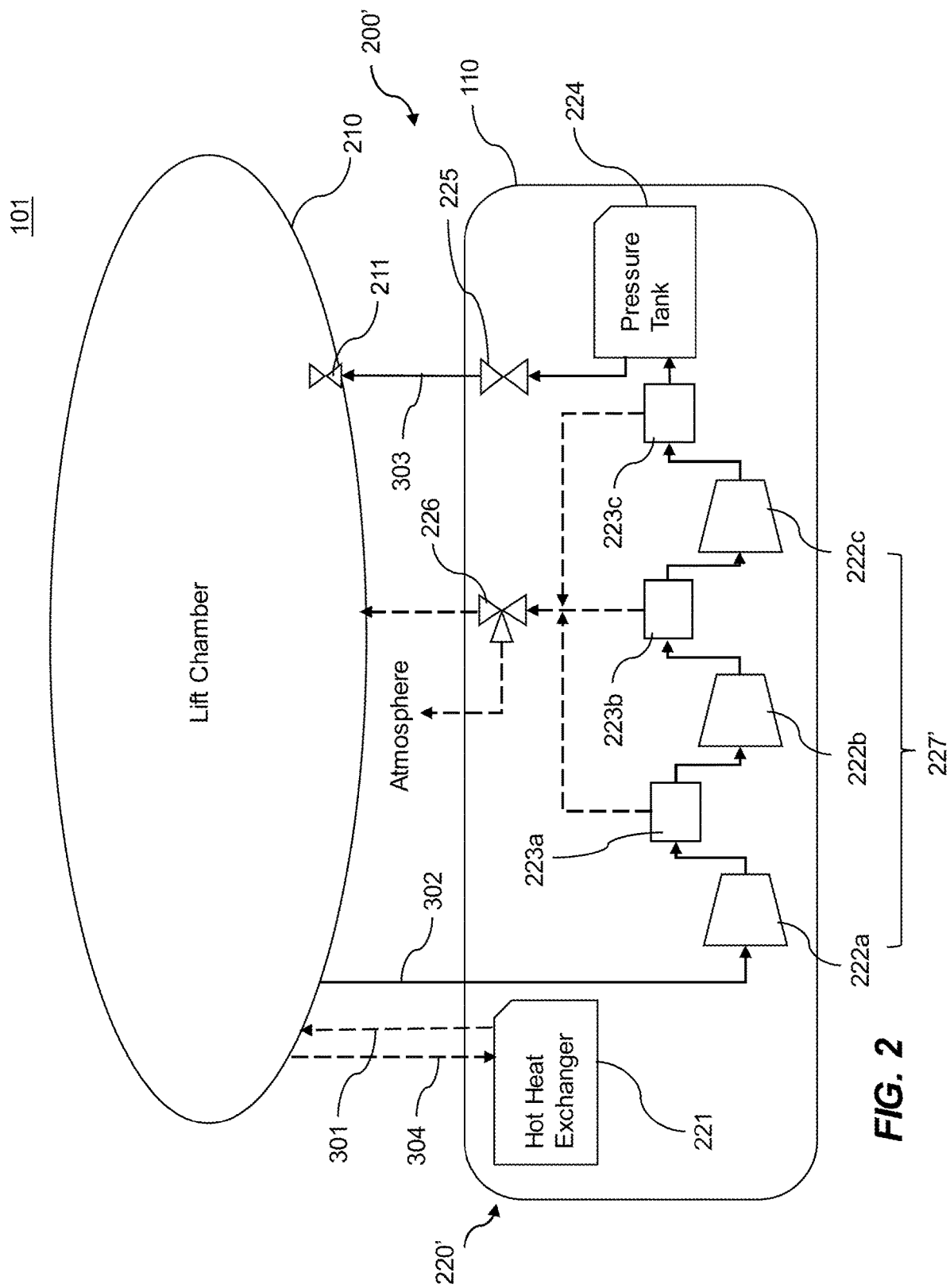
FIG. 2 is a diagram schematically illustrating another embodiment of the variable density airship lift chamber system of the disclosed invention, which includes multiple stage compression.

With reference to FIG. 2, shown is a diagram of an airship system 101 that includes another embodiment of the variable density airship lift chamber system 200' of the disclosed invention that includes lift chamber 210, refrigeration orifice 211, and lift chamber control unit 220'. The lift chamber 210 is a variable volume chamber that can expand and shrink as shown in FIG. 1. The difference is that compressor unit 227' of the lift chamber control unit 220' includes multiple stage compression which would be needed for high pressure storage. For the multiple stage compression, intercooling between stages is desirable as well as at final pressure. FIG. 2 exemplarily shows the compressor unit 227' that includes three compressors 222a, 222b, 222c and three intercoolers 223a, 223b, 223c coupled to the compressors. However, any number of the compressors and intercoolers may be employed depending on needs for pressure storage.

Figure 3:
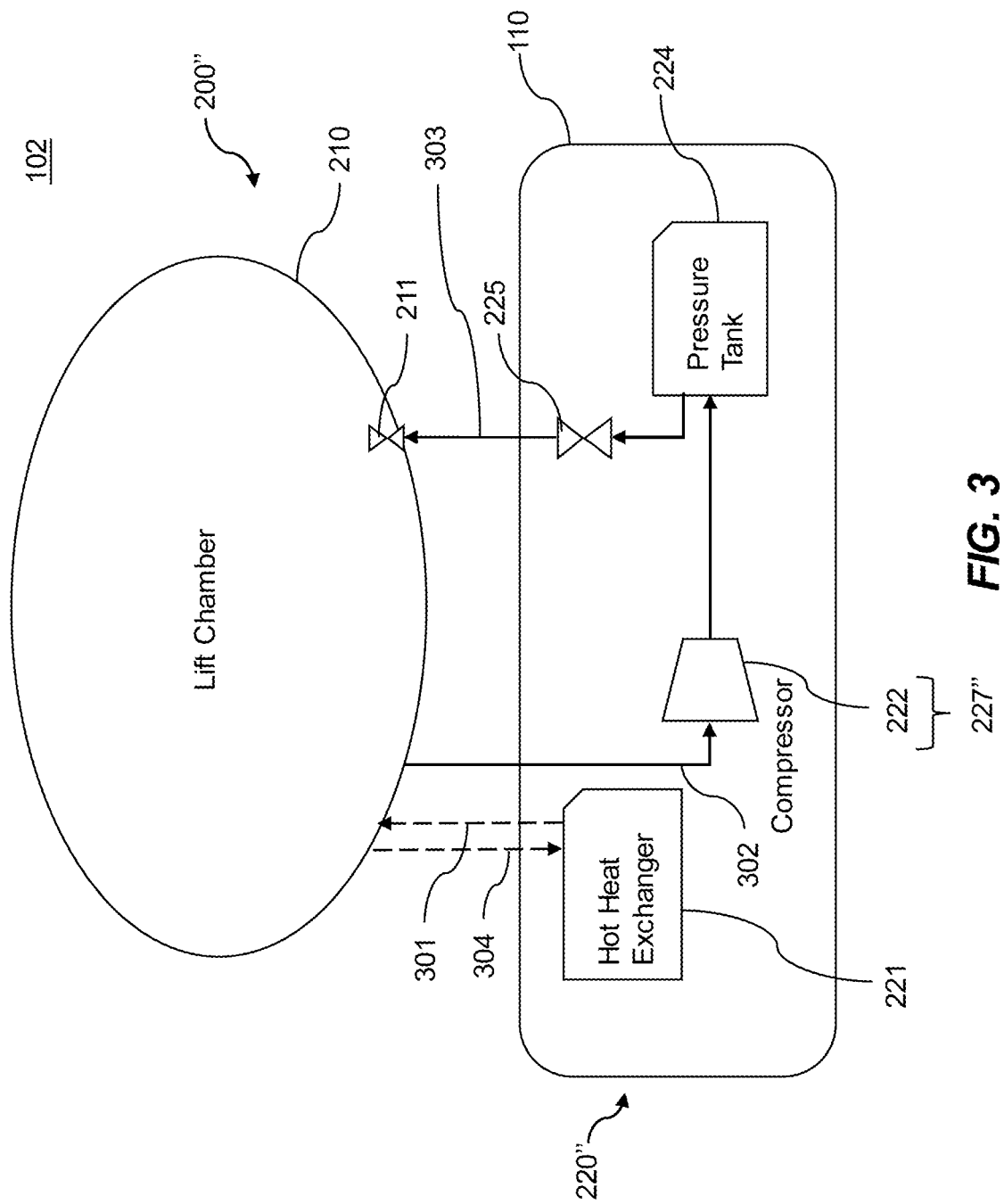
FIG. 3 is a diagram schematically illustrating another embodiment of the variable density airship lift chamber system of the disclosed invention, which is constructed without intercoolers.

With reference to FIG. 3, shown is a diagram of an airship system 102 that includes another embodiment of the variable density airship lift chamber system 200" of the disclosed invention that includes lift chamber 210, refrigeration orifice 211, and lift chamber control unit 220". The lift chamber 210 is a variable volume chamber that can expand and shrink as shown in FIG. 1. In this embodiment, the compressor unit 227" includes compressor 222 without intercooler.

Figure 4:
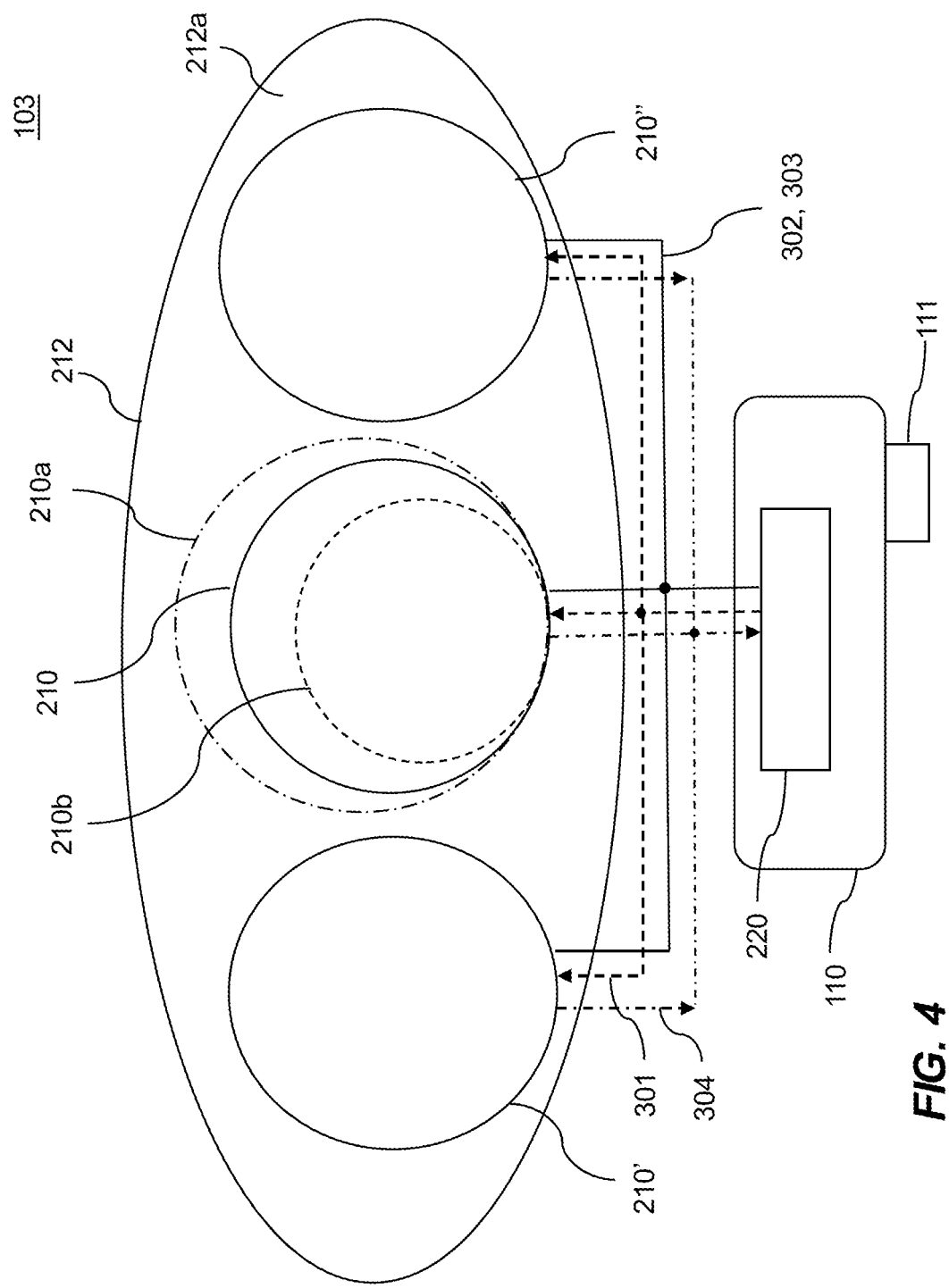
FIG. 4 is a diagram schematically illustrating an embodiment of an airship system having multiple lift chambers placed in an envelope.

With reference to FIG. 4, shown is a diagram of airship system 103 having multiple lift chambers 210, 210', 210". The lift chamber 210 may be the variable volume chamber described above, while the other lift chambers 210', 210" may be variable volume lift chambers or any other conventional type lift chambers. The variable volume lift chamber 210 is connected to the components in the lift chamber control unit 220 as described above referring to FIG. 1, 2 or 3. If the lift chambers 210', 210" are variable volume chambers, lift chambers 210, 210', 210" may be all connected to lift chamber control unit 220 that includes a heat exchanger 221, as shown in FIGS. 1-3, which adds heat to the lift gas flowing from the lift chambers 210, 210', 210" through lines 304 and supplies the heated lift gas to the lift chamber 210, 210', 210" through lines 301. The lift chamber control unit 220 includes the components that are described above referring to FIG. 1, 2 or 3. The lift chambers 210, 210', 210" may be connected to compressor 222 and pressure tank 224 through lines 302, 303, as shown in FIGS. 1-3. FIG. 4 exemplarily shows three lift chambers, but the airship system 103 may have any number of the lift chambers based on applications.

The lift chambers 210, 210', 210" may be placed inside an envelope 212. In an embodiment, the inner space 212a of the envelope 212 (outside the lift chambers 210, 210', 210") may be open to atmosphere. In another embodiment, the envelope 212 may be configured to control density of the air in the inner space 212a. In this case, the envelope 212 may have a vent opening (not shown) controlled by one or more air pumps (not shown). The air pumps may be operated to draw air into the inner space 212a or to exhaust air from the inner space 212a through the vent opening. By controlling air density in the inner space 212a of the envelope 212, the lifting force of the airship system 103 may be further controlled.

A combination of lighter-than-air gas with heating produces more lift and the ability to support more weight. With sufficient lift, a large airship could be used to lift trees selectively harvested from a remote forest, for processing in a facility suspended above the forest by the airship. The facility could cut the wood for lumber and use some of the rest for conversion to biochar to be reincorporated into the forest below or transported by the airship to desert or agricultural lands that need it. A few workers could either live on the airship and/or be ferried to it by, for example, a helicopter. Such a craft would be tethered by cables to the ground and be partially supported by power-generating kites or wind turbines.

The airship system of the disclosed invention provides a closed system of the lift gas by using the pressure tank 224 that stores the lift gas withdrawn from the lift chamber 210. The lift gas stored in the pressure tank 224 is supplied to the lift chamber 210 when necessary. In this configuration, the airship system of the disclosed invention provides advantages that loss of the lift gas in the airship system is minimized, which may reduce the operating cost of the airship system. Preventing loss of the lift gas is important in practical applications, especially when the lift gas is precious commodity or supply of the lift gas is limited. For example, helium supplies are valuable and of finite supply. Once released, the helium gas escapes to earth's atmosphere and never returns to the airship. Conservation of helium is important and operating a large fleet of airships would need a lift gas storage/conservation method while adjusting lift force. Adjusting the buoyancy lift force of airships by compressing and storing airship lift gas for future use eliminates the need to expel lift gas into the atmosphere.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. An airship lift chamber system for an airship, comprising:
   at least one lift chamber filled with lift gas and configured to provide lifting force;
   a heat exchanger configured to:
      receive the lift gas through a first gas line directly connected to the at least one lift chamber;
      heat the lift gas in the at least one lift chamber; and
      return the heated lift gas through a second gas line directly connected to the at least one lift chamber;
   a compressor configured to withdraw the lift gas from the lift chamber and to compress the withdrawn lift gas;
   a pressure tank configured to store the compressed lift gas from the compressor;
   a refrigeration orifice formed in the lift chamber; and
   a valve that connects the pressure tank to lift chamber through the refrigeration orifice.

2. The airship lift chamber system of claim 1, wherein the compressor comprises multiple compressors connected to the at least one lift chamber to withdraw the lift gas from the lift chamber and configured to compress the withdrawn lift gas.

3. The airship lift chamber system of claim 1, wherein the valve is configured to be closed while the heat exchanger heats the lift gas.

4. The airship lift chamber system of claim 1, wherein the lift gas is lighter-than-air gas.

5. The airship lift chamber system of claim 1, wherein the lift chamber is a variable volume chamber that is configured to be expandable and shrinkable.

6. The airship lift chamber system of claim 1, further comprising:
   an intercooler connected to the compressor and configured to cool the compressed lift gas from the compressor.

7. The airship lift chamber system of claim 6, further comprising a waste heat flow valve configured to transfer heat from the intercooler to at least one of the lift chamber and atmosphere.

8. The airship lift chamber system of claim 7, wherein the waste heat flow valve is further configured to transfer heat from the intercooler to the atmosphere while the compressor operates to provide more lift gas to the lift chamber from the pressure tank.

9. The airship lift chamber system of claim 7, wherein the waste heat flow valve is further configured to transfer heat from the intercooler to the lift chamber while the compressor operates to store the lift gas in the pressure tank.

10. An airship system, comprising:
    at least one lift chamber filled with lift gas and configured to provide lifting force;
    a gondola connected to the at least one lift chamber and comprising at least one lift chamber control unit that comprises:
       a heat exchanger configured to:
          receive the lift gas through a first gas line directly connected to the at least one lift chamber;

heat the lift gas in the at least one lift chamber; and
return the heated lift gas through a second gas line directly connected to the at least one lift chamber;

a compressor configured to withdraw the lift gas from the lift chamber and to compress the withdrawn lift gas; and a pressure tank configured to store the compressed lift gas from the compressor;

a refrigeration orifice formed in the lift chamber; and a valve that connects the pressure tank to lift chamber through the refrigeration orifice.

11. The airship system of claim 10, wherein the compressor comprises multiple compressors connected to the at least one lift chamber to withdraw the lift gas from the lift chamber and configured to compress the withdrawn lift gas.

12. The airship system of claim 10, wherein the valve is configured to be closed while the heat exchanger heats the lift gas.

13. The airship system of claim 10, wherein the lift gas is lighter-than-air gas.

14. The airship system of claim 10, wherein the lift chamber is a variable volume chamber that is configured to be expandable and shrinkable.

15. The airship system of claim 10, further comprising:
an intercooler connected to the compressor and configured to cool the compressed lift gas from the compressor.

16. The airship system of claim 15, further comprising a waste heat flow valve configured to transfer heat from the intercooler to at least one of the lift chamber and atmosphere.

17. The airship system of claim 13, wherein the waste heat flow valve is further configured to transfer heat from the intercooler to the atmosphere while the compressor operates to provide more lift gas to the lift chamber from the pressure tank.

18. The airship system of claim 16, wherein the waste heat flow valve is further configured to transfer heat from the intercooler to the lift chamber while the compressor operates to store the lift gas in the pressure tank.

\* \* \* \* \*